United States Patent
Rommann et al.

(10) Patent No.: US 10,520,094 B2
(45) Date of Patent: Dec. 31, 2019

(54) DOUBLE SIDED OUTER SEAL

(71) Applicant: Engineered Seal Products, Inc., Cedar Rapids, IA (US)

(72) Inventors: Andrew Rommann, Cedar Rapids, IA (US); Seth Chunn, Cedar Rapids, IA (US)

(73) Assignee: Engineered Seal Products, Inc., Cedar Rapids, IA (US)

( * ) Notice: Subject to any disclaimer, the term of this patent is extended or adjusted under 35 U.S.C. 154(b) by 0 days.

(21) Appl. No.: 15/169,971

(22) Filed: Jun. 1, 2016

(65) Prior Publication Data
US 2016/0377180 A1    Dec. 29, 2016

Related U.S. Application Data

(60) Provisional application No. 62/183,817, filed on Jun. 24, 2015.

(51) Int. Cl.
*F16J 15/3236* (2016.01)
*E02F 9/00* (2006.01)
*E02F 9/22* (2006.01)

(52) U.S. Cl.
CPC .......... *F16J 15/3236* (2013.01); *E02F 9/006* (2013.01); *E02F 9/226* (2013.01)

(58) Field of Classification Search
CPC .............................. F16C 1/00; F16C 33/7853
See application file for complete search history.

(56) References Cited

U.S. PATENT DOCUMENTS

| | | | | |
|---|---|---|---|---|
| 2,470,925 A | * | 5/1949 | Fredrickson | E03D 3/04 277/438 |
| 2,841,429 A | * | 7/1958 | McCuistion | F16J 15/3236 251/900 |
| 3,563,557 A | * | 2/1971 | Doutt | F16J 15/3236 277/438 |
| 4,190,378 A | | 2/1980 | Stecklein | |
| 4,210,405 A | | 7/1980 | Jesswein | |

(Continued)

FOREIGN PATENT DOCUMENTS

| | | |
|---|---|---|
| CN | 1407260 A | 4/2003 |
| DE | 102005001708 A1 | 7/2006 |

(Continued)

OTHER PUBLICATIONS

International Search Report and Written Opinion dated Sep. 16, 2016 for counterpart PCT Application No. PCT/US2016/035448.

(Continued)

*Primary Examiner* — Eugene G Byrd
(74) *Attorney, Agent, or Firm* — Shuttleworth & Ingersoll, PLC; Jason Sytsma

(57) ABSTRACT

Seal with a body that has bilateral symmetry. The body comprises of a first sealing lip on a right side of the body and a second sealing lip on the right side of the body that is positioned radially below and axially inward with respect to the first sealing lip. The body further comprises of a third sealing lip on a left side of the body and a fourth sealing lip on the left side of the body positioned radially below and axially inward with respect to the third sealing lip. In the installed position, the first sealing lip is flexed away from the second sealing lip and the third sealing lip is flexed away from the fourth sealing lip.

18 Claims, 4 Drawing Sheets

(56) References Cited

U.S. PATENT DOCUMENTS

| | | | |
|---|---|---|---|
| 4,234,198 A | 11/1980 | Martin et al. | |
| 4,304,415 A * | 12/1981 | Wolf | F16L 47/065 |
| | | | 277/615 |
| 4,361,335 A | 11/1982 | Vinciguerra | |
| 4,417,735 A | 11/1983 | Heisler | |
| 4,582,330 A * | 4/1986 | Lew | F16J 15/025 |
| | | | 277/330 |
| 4,772,150 A | 9/1988 | Horton | |
| 4,991,858 A | 2/1991 | Abila et al. | |
| 5,261,677 A * | 11/1993 | Gotoh | F16J 15/32 |
| | | | 277/438 |
| 5,503,408 A * | 4/1996 | Hemann | F16J 15/3232 |
| | | | 277/565 |
| 5,687,976 A * | 11/1997 | Andrick | F16J 15/027 |
| | | | 277/605 |
| 6,343,623 B2 * | 2/2002 | Hegler | F16L 21/035 |
| | | | 138/109 |
| 6,550,781 B1 * | 4/2003 | Robotham | B21B 31/078 |
| | | | 277/551 |
| 6,802,513 B2 * | 10/2004 | Ranzau | F16J 15/025 |
| | | | 277/641 |
| 7,367,739 B2 | 5/2008 | Brock et al. | |
| 7,922,179 B2 * | 4/2011 | Andrick | F16L 21/03 |
| | | | 277/615 |
| 8,783,694 B2 * | 7/2014 | Matsuo | F16J 15/025 |
| | | | 277/637 |
| 8,794,639 B2 * | 8/2014 | Westhoff | E03F 3/04 |
| | | | 277/605 |
| 2001/0027818 A1 | 10/2001 | Hegler | |
| 2003/0001343 A1 | 1/2003 | Andrick | |
| 2004/0079032 A1 * | 4/2004 | Russell | F16J 15/027 |
| | | | 49/498.1 |
| 2008/0088096 A1 | 4/2008 | Andrick et al. | |
| 2008/0231110 A1 | 9/2008 | Mulligan et al. | |

FOREIGN PATENT DOCUMENTS

| | | | |
|---|---|---|---|
| EP | 2792915 A1 | 10/2014 | |
| JP | 54182766 | 6/1978 | |
| JP | 5947767 | 3/1984 | |
| JP | 2001349433 A | 12/2001 | |
| JP | 2003083455 A * | 3/2003 | F16C 33/72 |
| WO | 2004036070 | 4/2004 | |
| WO | WO2009151938 A1 | 12/2009 | |

OTHER PUBLICATIONS

International Search Report dated Oct. 2, 2008 from related International Application No. PCT/US2008/05411.

Chinese Office Action dated Dec. 5, 2018 for counterpart Chinese Patent Application No. 201680036938.6.

Chinese Office Action dated Aug. 2, 2019 for counterpart Chinese Patent Application No. 201680036938.6.

Office Action issued by the Indian Patent Office dated Jul. 26, 2019 for counterpart Indian Patent Application No. 201717044985.

Japanese Office Action dated Aug. 21, 2018 for counterpart Japanese Patent Application No. JP2017-564661.

\* cited by examiner

DOUBLE SIDED OUTER SEAL

This application claims priority to U.S. Provisional Pat. App. No. 62/183,817 filed Jun. 24, 2015, which is incorporated by reference herein.

BACKGROUND

Pivot joints used in the linkages of work vehicles, such as, for example, loader backhoes and four wheel drive loaders include pins and bushings to allow relative rotation between connected parts. These pivot joints conventionally include seals between the pins and the bushings as barriers to debris. However, due to the harsh environments in which these vehicles are used, i.e., an environment having significant amounts of dirt and debris, dirt and debris tends to get past these barriers and cause accelerated wear of the pivot joints.

Some manufacturers of work vehicles have sought to remedy the difficulties outlined above by forming pre-barriers, i.e., a first line of defense against debris, via O-rings located between outer surfaces of the connected portions of linkages and work tools; however, this approach has led to at least the following two difficulties: (1) the O-rings are typically round, allowing dirt and debris to eventually work past the O-ring and into the space between the pins and bushings; and (2) the O-rings wear and their eventual replacement requires disconnection of the rotationally connected parts, a substantial expense with respect to time and money.

SUMMARY

Disclosed is a seal with a body that has bilateral symmetry. The body comprises of a first sealing lip on a right side of the body and a second sealing lip on the right side of the body that is positioned radially below and axially inward with respect to the first sealing lip. The body further comprises of a third sealing lip on a left side of the body and a fourth sealing lip on the left side of the body positioned radially below and axially inward with respect to the third sealing lip. In the installed position, the first sealing lip is flexed away from the second sealing lip and the third sealing lip is flexed away from the fourth sealing lip.

The first sealing lip can have a convex curve that bends the first sealing lip away from the second sealing lip. The third sealing lip can similarly have such a convex curve. The second sealing lip can be defined by a top surface that is declined away in a radial direction from the first sealing lip on one side and on the other side by a concave curved inner surface that allows the second sealing lip to bend toward the first sealing lip. The fourth sealing lip can similarly have such a configuration.

The seal can have an outer surface an outer diameter around a longitudinal axis, and a second portion integral with the outer surface positioned along an arc of the outer diameter and split in a plane parallel to the longitudinal axis to form two ends. A fastener can be provided to selectively hold the two ends together.

The seal can be positioned in a pivot joint on the chamfered faces of a first member and a second member to cover a gap between them. The seal rides up and down the chamfered faces when the gap changes due to normal operation of the machinery and as the joints experience wear. The seal is positioned partially in the gap to seal the gap from external debris.

DESCRIPTION OF THE ILLUSTRATED EMBODIMENT

Figure 1:
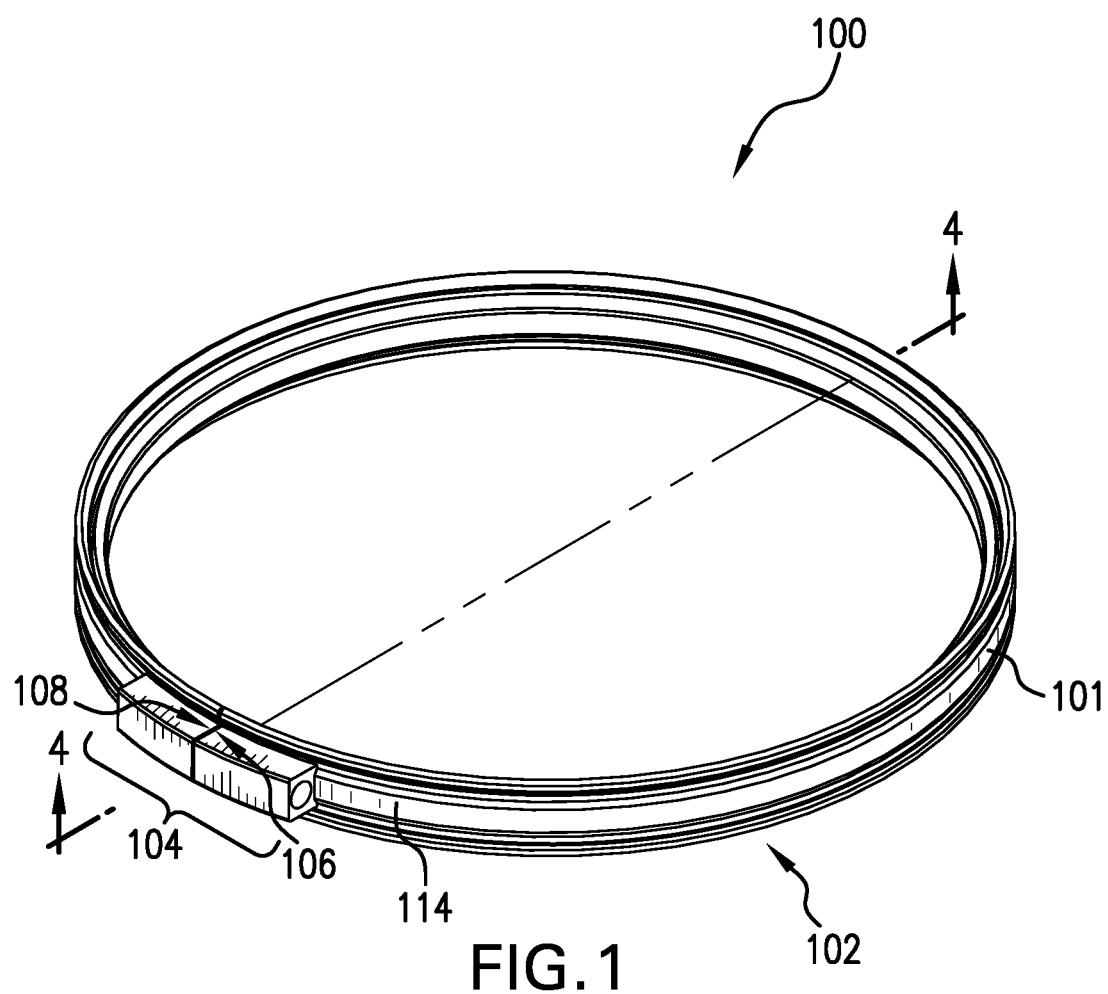
FIG. 1 is a perspective view of an outer seal according to this disclosure.

FIG. 1 shows an outer seal 100. Seal 100 is defined by an outer surface 101 forming an outer diameter around a longitudinal axis 103. Throughout this specification reference will be made to axial direction, which refers to a direction parallel with the longitudinal axis 103, and a radial direction, which refers to a direction perpendicular to the longitudinal axis 103. Seal 100 includes a first portion 102 and can include a second portion 104. In an embodiment with second portion 104, second portion 104 is positioned along an arc 114 of the outer diameter of seal 100, and can be integral with first portion 102. Second portion 104 includes a through-hole 107 to receive a fastener. In such an embodiment, seal 100 is split on a plane parallel to the longitudinal axis 103 to form a first end 106 and a second end 108, which can selectively be joined together at second portion 104 by the fastener through through-hole 107. In an alternative embodiment, seal 100 is not split, and therefore, does not include second portion 104.

Figure 2:
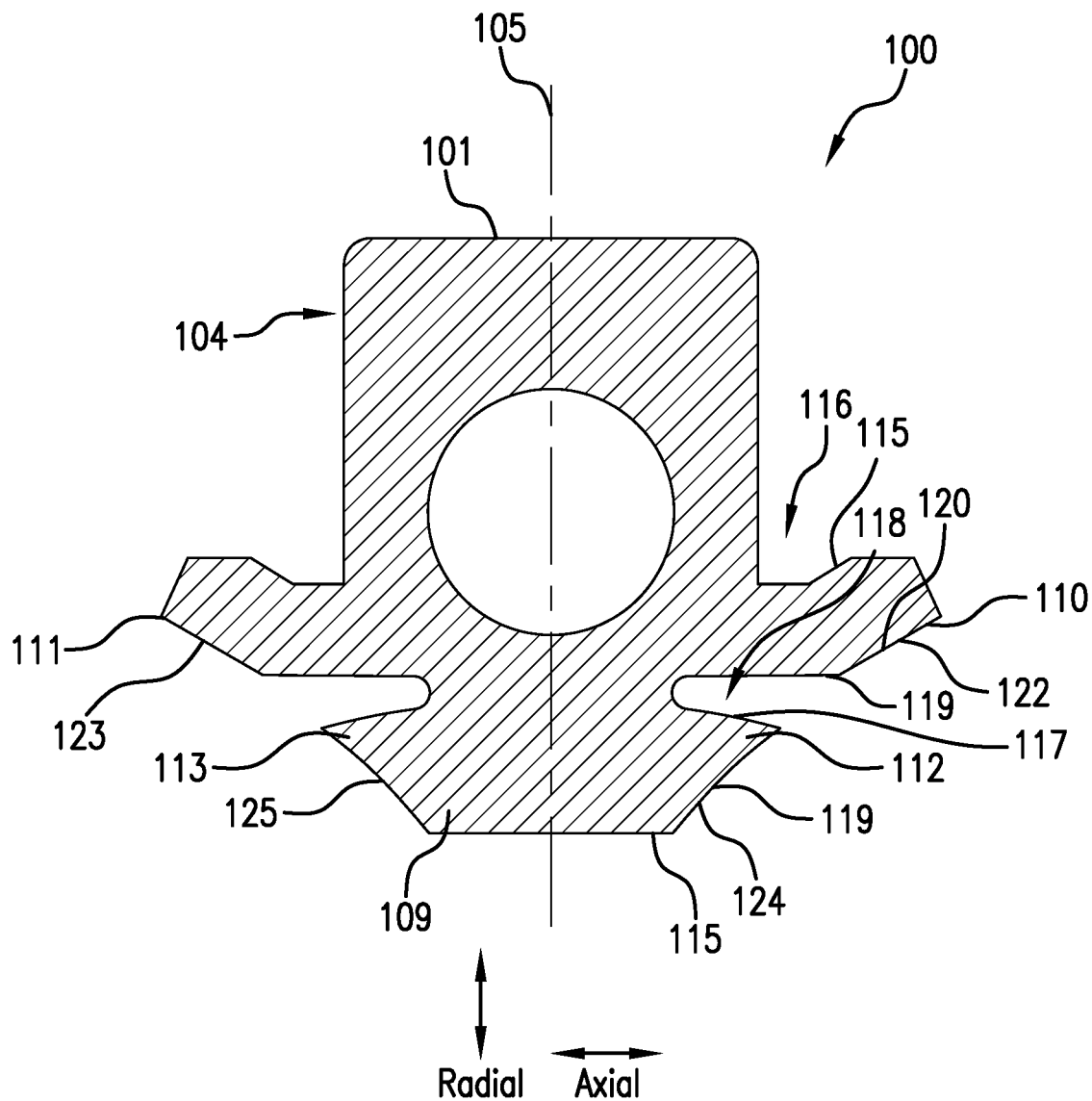
FIG. 2 is a profile view of the outer seal of FIG. 1.

FIG. 2 shows a close-up, cross-sectional view of seal 100 in a rest position. Seal 100 has a body 109 with a cross section that bilateral symmetry on each side of a bilateral line 105 so that the right side of body 9 is the same as the left side of body 9.

Body 109 of seal 100 has a first sealing lip 110 with a first sealing surface 122 that functions as a primary seal. A second sealing lip 112 with a second sealing face 124 is spaced radially apart and beneath first sealing lip 110, and functions as a secondary seal. Second sealing lip 112 also provides stability when moving up and down chamfered face 208. As second sealing lip 112 rides up chamfered face 208, additional radial loading is created and secondary sealing lip 112 helps to ensure the symmetric distribution of the of the loading and prevent seal 100 from becoming misaligned in gap 118. Second sealing lip 112 has a top surface 117 that is flexed slightly downward with respect to an outer surface 101 of seal 100 and second sealing face 124 having an inwardly, concave curved surface that allows the second sealing lip 112 to bend toward the first sealing lip 110. Top surface 117 is declined away in a radial direction from first sealing lip 110. Top surface 117 and second sealing face 124 come together at a vertex to form the tip of second sealing lip 112.

First sealing lip 110 comprises an upper surface 115, a bottom surface 119, and first sealing surface 122 on a right side of body 109 (which is substantially solid except in second portion 104). Upper surface 115 and first sealing surface 122 are oriented away from longitudinal axis 103 in the uninstalled state. First sealing lip 110 is designed to flex away from second sealing lip 112 when it is installed. A gap 118 separates first sealing lip 110 from second sealing lip 112 to enable first sealing lip 110 to flex independently of second sealing lip 112. Gap 118 is bounded by top surface of second sealing lip 112 and a convex curve 120 on first sealing lip 110. Convex curie 120 on first sealing lip 110 improves the flexibility of first sealing lip 110 to allow first sealing lip 110 to bend away from second sealing lip 112. A depression 116 between first sealing lip 110 and outer surface 101 cooperates with convex curve 120 on first sealing lip 110 to allow first sealing lip 110 to bend away from second sealing lip 112. The dimensions and shape of depression 116 can be modified to vary the radial loading on seal 100 according to the application.

First sealing lip 110 can be undercut to flex away from second sealing lip 112 when it is installed. An undercut gap 118 separates first sealing lip 110 from second sealing lip 11112 to enable first sealing lip 110 to flex independently of second sealing lip 112. The shape of gap 118 can be varied to change the flexibility and compliance of first sealing lip 110 and second sealing lip 112 or to add manufacturing or installation efficiencies.

Body 102 of seal 100 has bilateral symmetry. Seal 100 has a third sealing lip 111 and a third sealing surface 123 of similar dimension and position as first sealing lip 110. Seal 100 has a fourth sealing lip 113 and a fourth sealing surface 125 of similar dimensioning and position as second sealing lip 112. In this regard, when seal 100 is installed, third sealing lip 111 functions similar to first sealing lip 110 and fourth sealing lip 113 functions similar to second sealing lip 112. On the other side of the linkage, gap 206 is sealed by third sealing lip 111 and fourth sealing lip 113 that each engages a chamfered face 210 of second member 204. Fourth sealing lip 113 is the secondary seal for the primary seal, third sealing lip 111.

Figure 3:
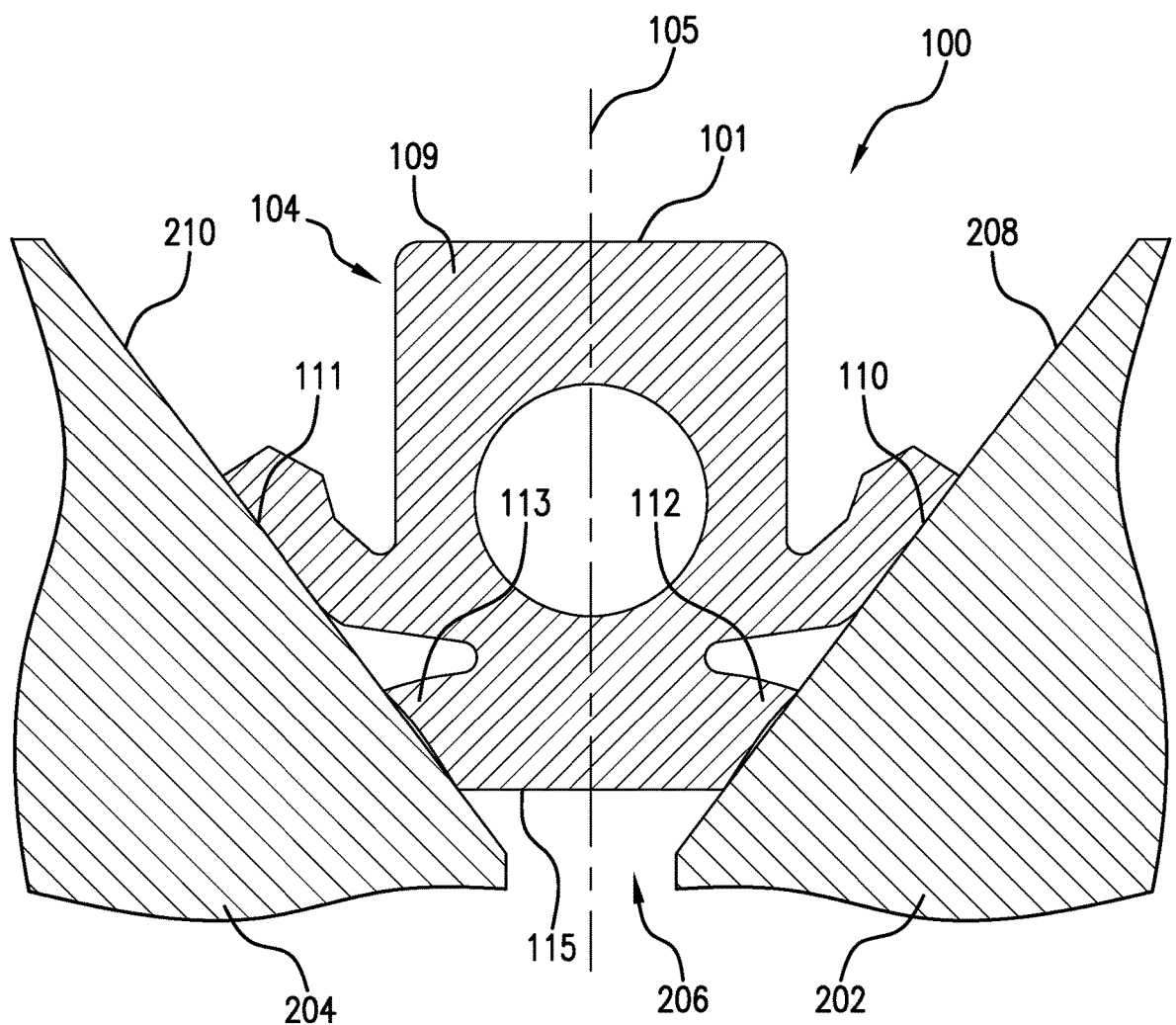
FIG. 3 is a profile view of the outer seal of FIG. 1 in an installed position.
Figure 4:
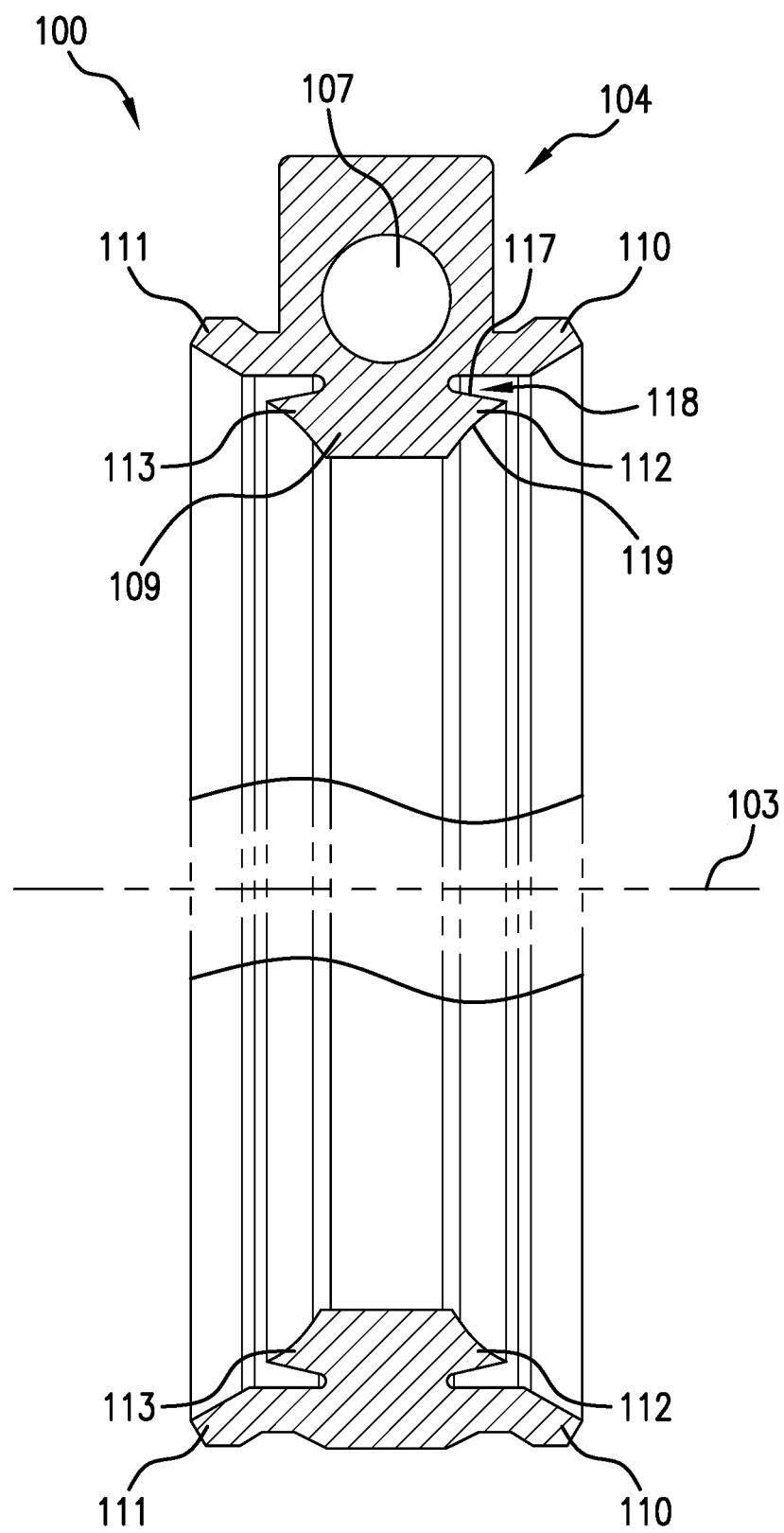
FIG. 4 is a cross-sectional view of the outer seal of FIG. 1 taken along the line 4-4.

FIG. 3 shows seal 100 placed around a gap 206 over a connecting linkage between a first member 202 and a second member 204. Connecting linkage can, for example, be a pivot joint with a greaseless bushing. Greaseless style bushings require many levels of sealing to ensure bushing life. Seal 100 can form an exterior seal over gap 206 of the pivot joint to keep out dirt and abrasives in extreme environmental operating conditions.

Seal 100 adjusts to seal gaps of considerable range without falling into connecting linkages during operation of a machine. In this regard, seal 100 can be constructed of any material of suitable flexibility and durability to allow seal 100 to be installed and removed without the need to undue the connecting linkages. Similar advantages apply to the solid variant of seal 100 too. In another embodiment of seal 100, it is not split, and seal 100 can include a spring around its outer circumference to hold seal 100 in position.

When seal 100 is installed, first sealing lip 110 flexes upward shortening the axial width of seal 100 and bringing second sealing lip 112 toward first member 202. Either upon installation or after a few hours of use, second sealing lip 112 and second sealing surface 124 engages first member 202. Each first sealing lip 110 and first sealing face 122 and second sealing lip 112 and second sealing surface 124 engages and rides on a chamfered face 208 of first member 202, which keeps dust and external debris out of gap 206. When first sealing lip 110 (i.e. the primary seal) fails, second sealing lip 112 (i.e. the secondary seal) functions as a backup. Second sealing lip 112 also functions to take the load off of first sealing lip 110. Rather than the force being applied solely to first sealing lip 110, the force is distributed across second sealing lip 112. Distributing the force across two lips, first sealing lip 110 and second sealing lip 112, increases the useful life of the primary, first sealing lip 110 and creates a better seal.

Seal 100 is dinstguishable over prior art seals in several respects. Seal 100 has bilateral symmetry for riding on and sealing two chamfered faces, 208, 210. Seal 100 rides up and down chamfered faces 208, 210 when gap 206 changes due to normal operation of the machinery and as the joints experience wear. First sealing lip 110 and third sealing lip 111 are designed to flex or distort to decrease the axial width of seal 100 so seal 100 conforms to the general dimensions of gap 206 between first member 202 and second member 204.

To those skilled in the art to which this invention relates many changes in construction and widely differing embodiments and applications of the invention will suggest themselves without departing from the spirit and scope of the invention; for example, one skilled in the art would recognize that more lips can be added to provide additional protection. The disclosures and the descriptions herein are purely illustrative and are not intended to be in any sense limiting. Various aspects of the different embodiments can be combined in different combinations to create new embodiments within the scope of the invention.

What is claimed is:

1. A seal comprising an uninstalled state and an installed state when in an installed position, the seal comprising:
   a substantially solid body with bilateral symmetry extending around a longitudinal axis, the substantially solid body comprising
   a first sealing lip extending outward on a right side of the substantially solid body comprising an upper surface at a positive angle with respect to the longitudinal axis and a first sealing surface opposite the upper surface at a positive angle with respect to the longitudinal axis, wherein the upper surface and the first sealing surface are oriented away from the longitudinal axis in the uninstalled state;
   a second sealing lip on the right side of the substantially solid body positioned radially below and axially inward with respect to the first sealing lip, the second sealing lip comprising a top surface and a second sealing face at a positive angle with respect to the longitudinal axis, wherein in an installed position the first sealing lip is flexed away from the second sealing lip;
   a gap extending into the substantially solid body between the first sealing lip and the second sealing lip formed by the bottom surface of the first sealing lip and the top surface of the second sealing lip;
   a third sealing lip on a left side of the substantially solid body; and
   a fourth sealing lip on the left side of the substantially solid body positioned radially below and axially inward with respect to the third sealing lip, wherein in the installed position the third sealing lip is flexed away from the fourth sealing lip.

2. The seal of claim 1, wherein the first sealing lip further comprise a convex curve that bends the first sealing lip away from the second sealing lip.

3. The seal of claim 2, wherein the third sealing lip further comprises a convex curve that bends the third sealing lip away from the fourth sealing lip toward the first sealing lip.

4. The seal of claim 1, wherein the second sealing lip is defined by a top surface and an inner surface with a concave curve that allows the second sealing lip to bend toward the first sealing lip.

5. The seal of claim 4, wherein the top surface is declined away in a radial direction from the first sealing lip.

6. The seal of claim 1, and further comprising an outer surface forming an outer diameter of the substantially solid body around the longitudinal axis, and a depression radially inward and axially outward from the outer surface between the first sealing lip and the outer surface that cooperates with an orientation of the first sealing lip to allow the first sealing lip to bend away from the second sealing lip.

7. The seal of claim 1, wherein the seal has an outer surface defining an outer diameter around a longitudinal axis, and the seal further comprises a second portion integral with the outer surface and along an arc of the outer diameter and split in a plane parallel to the longitudinal axis to form two ends with a void extending through the second portion; and a fastener extendable through the void to selectively hold the two ends together, and wherein the void in the second portion is the only non-solid portion of the substantially solid body.

8. The seal of claim 1, and further comprising a first sealing surface on the first lip and a second sealing surface on the second lip, wherein the first sealing surface and the second sealing surface are aligned in an installed position.

9. A machine comprising:
   a pivot joint comprising a first member with a chamfered face and a second member comprising a chamfered face, wherein one of the first member and the second member rotates with respect to the other and are separated from each other by a gap; and
   a seal comprising an uninstalled state and an installed state when positioned partially in the gap to seal the gap from external debris, the seal comprising,
   a substantially solid body with bilateral symmetry extending around a longitudinal axis, the substantially solid body comprising
   a first sealing lip extending outward on a right side of the substantially solid body comprising an upper surface at a positive angle with respect to the longitudinal axis and a first sealing surface opposite the upper surface at a positive angle with respect to the longitudinal axis, wherein the upper surface and the first sealing surface are oriented away from the longitudinal axis in the uninstalled state,
   a second sealing lip on the right side of the substantially solid body positioned radially below and axially inward with respect to the first sealing lip, the second sealing lip comprising a top surface and a second sealing face at a positive angle with respect to the longitudinal axis, wherein in an installed position the first sealing lip is flexed away from the second sealing lip,
   a gap extending into the substantially solid body between the first sealing lip and the second sealing lip formed by the bottom surface of the first sealing lip and the top surface of the second sealing lip:
   a third sealing lip on a left side of the substantially solid body, and
   a fourth sealing lip on the left side of the substantially solid body positioned radially below and axially inward with respect to the third sealing lip, wherein in the installed position the third sealing lip is flexed away from the fourth sealing lip.

10. The machine of claim 9, wherein the first sealing lip further comprise a convex curve that bends the first sealing lip away from the second sealing lip.

11. The machine of claim 10, wherein the third sealing lip further comprises a convex curve that bends the third sealing lip away from the fourth sealing lip toward the first sealing lip.

12. The machine of claim 9, wherein the second sealing lip is defined by a top surface and an inner surface with a concave curve that allows the second sealing lip to bend toward the first sealing lip.

13. The machine of claim 12, wherein the top surface is declined away in a radial direction from the first sealing lip.

14. The machine of claim 9, and further comprising a depression between the first sealing lip and an outer surface that cooperates with a convex curve on the first sealing lip to allow the first sealing lip to bend away from the second sealing lip.

15. The machine of claim 9, wherein the seal has an outer surface defining an outer diameter around a longitudinal axis, and the seal further comprises a second portion integral with the outer surface and along an arc of the outer diameter and split in a plane parallel to the longitudinal axis to form two ends; and a fastener to selectively hold the two ends together.

16. The machine of claim 9, and further comprising a first sealing surface on the first lip engaged with the chamfered face of the first member, and a second sealing surface on the second lip engaged with the chamfered face of the first member, a third sealing surface on the third lip engaged with the chamfered face of the second member, and a fourth sealing surface engaged with the chamfered face of the second member.

17. The seal of claim 1, and further comprising a gap between the first sealing lip and the second sealing lip that extends axially inward more than half a bilateral thickness of the body measured from a tip of the first sealing lip and a bilateral line of the body.

18. The seal of claim 1, wherein the second sealing lip comprises a second sealing surface oriented away from the longitudinal axis in the uninstalled state, and wherein in the installed position the first sealing lip is flexed away from the second sealing lip.

* * * * *